United States Patent

[11] 3,602,887

[72] Inventor Chao K. Chow
Chappaqua, N.Y.
[21] Appl. No. 704,317
[22] Filed Feb. 9, 1968
[45] Patented Aug. 31, 1971
[73] Assignee International Business Machines Corporation
Armonk, N.Y.
Continuation-in-part of application Ser. No. 682,351, Nov. 13, 1967, now abandoned.

[54] PATTERN CLASSIFICATION METHOD AND APPARATUS
7 Claims, 5 Drawing Figs.

[52] U.S. Cl. 340/146.3 P
[51] Int. Cl. G06k 9/12
[50] Field of Search 340/146.3; 235/181, 193.5, 197; 338/15, 17; 328/142, 143, 144, 145, 146; 307/229

[56] References Cited

UNITED STATES PATENTS

| | | | |
|---|---|---|---|
| 3,064,519 | 11/1962 | Shelton, Jr. | 340/146.3 X |
| 3,197,736 | 7/1965 | Leightner et al. | 340/146.3 |
| 3,435,244 | 3/1969 | Burckhardt et al. | 340/146.3 X |
| 3,214,603 | 10/1965 | Von Urff, Jr. | 235/197 |
| 3,435,138 | 3/1969 | Borkan | 340/146.3 UX |

*Primary Examiner*—Maynard A. Wilbur
*Assistant Examiner*—Leo H. Boudreau
*Attorneys*—Hanifin and Jancin and John E. Dougherty, Jr.

ABSTRACT: The apparatus for practicing the method of classifying patterns is a character recognition system. An optical representation of a function of an unknown character is obtained by applying noncoherent light to a document on which the character is recorded. This optical representation is then applied to a number of masks, one for each possible character, which contain optical representation of the characters, and an optical correlation function for each mask is produced. Each of these optical correlation functions is applied to a separate group of photocells, which produce signals that are linearly proportional to the intensity of different portions of the correlation function. The output of each photocell is applied to a nonlinear diode which produces an output proportional to a constant raised to the value represented by the input signal applied to the diode. The outputs from these diodes for each correlation function are summed to provide a signal representative of a nonlinear function of each correlation function. Since the outputs from all photocells in a given group are summed, it makes no difference which photocell emits the peak representing output and thus the positional registrations is immaterial. This makes the system translation invariant. The representative signals are compared in a maximum selection circuit to determine which signal is largest and thus identifies the unknown character. The invention is also embodied in a system in which coherent light supplied by a laser is applied to the unknown character to obtain a coherent light representation of that character. In this system, the masks storing the optical functions of the unknown characters are in the form of a hologram. Further, field effect transistors are connected to the outputs of the photocells. These transistors translate the outputs of the photocells, which are representative of the intensity of the applied light, to outputs which are proportional to the square root of the intensity of applied light, and these outputs are applied as inputs to the nonlinear or exponential diodes.

INVENTOR
CHAO K. CHOW
BY John E. Dougherty Jr.
ATTORNEY

PATTERN CLASSIFICATION METHOD AND APPARATUS

This is a continuation in part of application Ser. No. 682,351, filed Nov. 13, 1967, and now abandoned.

FIELD OF THE INVENTION

The invention relates broadly to pattern classification systems and more particularly to character recognition systems. The inventive method may be practiced by generating an electrical representation, for example in digital form, of a character to be recognized and electrically comparing this representation with stored representations of known characters. However, in the preferred mode of practicing the invention an optical representation of an unknown pattern is produced and optically correlated with stored functions of known characters. In either case, a plurality of electric signals representative of each correlation function are obtained and these signals are applied to a nonlinear circuit. One example of such a circuit is an exponential circuit, the function of which is to produce an output proportional to a constant raised to a power equal to the value represented by the input signal. The exponential outputs for each correlation function are then summed and applied to comparing circuitry to classify or identify the unknown pattern.

PRIOR ART

The pertinent prior art is as follows:

a. *Optical and Electro-Optical Information Processing*, edited by Tippet et al., Chapters 7 and 24, MIT Press, 1965.

b. Copending application Ser. No. 565,519, filed July 15, 1966 in behalf of Dennis Gabor and commonly assigned.

SUMMARY OF THE INVENTION

The pattern classification system of the present invention is invariant with respect to the translational position of the input pattern to be identified. Therefore, it is not necessary to accurately register the input pattern. Further, the method of the present invention is an optimum method in terms of recognizing patterns in the presence of certain types of noise, usually present in a pattern recognition system. Such noise may be additive gaussian and/or may be noise having a binomial distribution. At the same time, in carrying out the method of the invention, the difficulty of identifying peaks achieved as a result of correlation of the input pattern function with stored functions is avoided. This is accomplished by use of an array of sensors, and at the same time more reliable classification and identification is achieved, by utilizing all of the information in the correlation functions for classification and identification. More specifically, each correlation function is made up of a number of values and electrical signals representative of these values are derived and are applied to an exponential circuit. The function of this circuit is to produce an output proportional to a constant raised to a power having the value represented by the input. It is these values which are applied to the conventional type summing and maximum selection circuitry to achieve classification and/or identification of the unknown patterns. The electrical signals representative of the various values of the correlation function are achieved by applying an optical representation of this function to a plurality (an array) of photodiodes. The exponential output is realized merely by connecting the output of each photodiode to a nonlinear diode which inherently provides the desired exponential output. In applications using coherent light and holographic masks the information content of the correlation function is primarily in the amplitude of the optical representation of this function. The outputs of the photodiodes are linearly proportional to the intensity of the light applied. In such applications, electrical signals which are proportional to the intensity of the square root of the light input to the photodiodes are derived and these signals are applied to the exponential diodes. Deriving the square root of the output signal from the photodiodes is accomplished most easily using an insulated gate field effect transistor in the circuit connecting the output of the photodiode to the input of the exponential diode. The system used to practice the invention may include individual discrete devices such as the photodiodes, field effect transistors, and nonlinear diodes described above. These devices may also be fabricated as integrated circuits in such a way that the individual devices remain essentially discrete. However, the system for practicing the method may be also fabricated using sheets of photoconductive and semiconductive material, for example, which perform the same functions as the discrete devices, but on which the devices which perform these functions are not necessarily physically discrete.

OBJECTS

It is an object of the present invention to provide an improved pattern classification system and more specifically an improved character recognition system.

It is a further object to provide a new and improved method of electrically analyzing the correlation functions in a pattern classification system to achieve the most reliable pattern classification.

It is a further object to provide a method of the above described type which can be carried out by simple and inexpensive electrical circuitry.

It is a more specific object of the present invention to provide a system of the above described type in which it is not necessary to examine the various correlation functions produced by the system to ascertain the peak value of each correlation function.

It is a further object to provide a reliable pattern classification system which is implemented using inexpensive and simple electrical circuitry of the type which can be fabricated in integrated circuit form.

The foregoing and other objects, features and advantages of the invention will be apparent from the following more particular description of preferred embodiments of the invention, as illustrated in the accompanying drawings.

Figure 1:
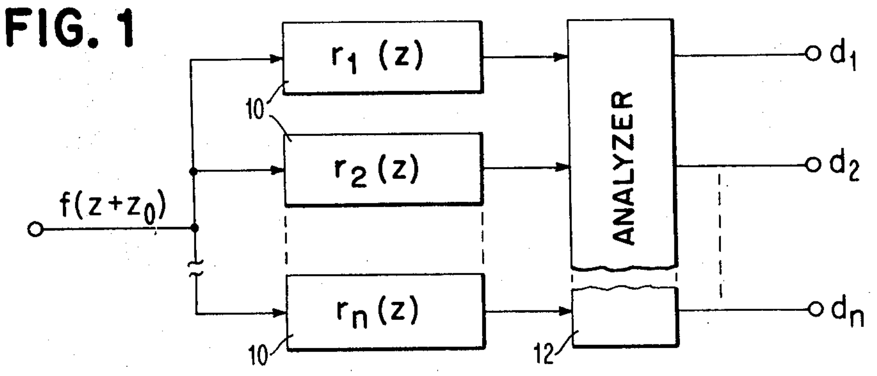
FIG. 1 is a block diagram representation indicating the major steps in a pattern recognition system.

The block diagram of FIG. 1 is generally representative of the steps involved in pattern classification, or more precisely in terms of the specific disclosed embodiments of the invention, character recognition. A representation or function of a character, including allowance for misregistration, is represented as $f(z+z_0)$. This representation may be optical or electrical. The function is applied as an input to a plurality of masks 10 which store functions of known characters $r_1(z)$, $r_2(z)... r_n(z)$. The input function is cross correlated with the stored functions and a plurality of correlation functions are realized. Each correlation function is a cross correlation of the input function with one of the stored functions. By cross correlation it is meant that the input function is compared with the stored functions in a plurality of different spatial relationships, the purpose of this being to allow for recognition of characters which are not perfectly registered on the document from which they are read. The correlation functions are applied to an analyzer 12, in which they are processed and/or directly analyzed to determine which of the stored characters is the best match for the unknown input character. An output is then provided on the appropriate one of the output terminals $d_1, d_2...d_n$.

In the practice of the present invention, the method of realizing the function $f(z+z_0)$ of the input character to be identified and the manner in which this function is cross correlated with stored functions is the same as in conventional systems. The inventive method is directed to the manner in which the correlation function information is processed in order to determine the best match. More specifically, the method of the present invention utilizes all of the information in each correlation function and derives exponential projections of a plurality of different values which make up each correlation function. These exponential projections are integrated to provide a sum for each correlation function and the one having the largest sum is identified as the best match. By exponential projection it is meant that each of the values of the correlation function is used as an exponential to which a constant is raised. Mathematically this process is expressed as follows:

$$S_1=K_1\int\exp\{\int f(z+z_0)r_1(z)dz\}dz_0$$

Not only is the process of pattern recognition using the system discussed herein invariant relative to the translational position of the pattern to be identified, but the method using the exponential projections, as set forth in the equation above, is considered to be an optimum one for recognizing patterns in the environment of an actual recognition system. In such systems, there are present noise and other factors which are the source of errors in recognition. This noise usually includes additive guassian type noise as well as noise having a binomial distribution. The present method is an optimum one for recognizing patterns in this type of environment. (See, for example, the theoretical analysis relative to additive guassian noise, from an information theory standpoint, Chapter 4 of *Probability and Information Theory*, by P. M. Woodward, McGraw-Hill, 1953.)

Figure 2:
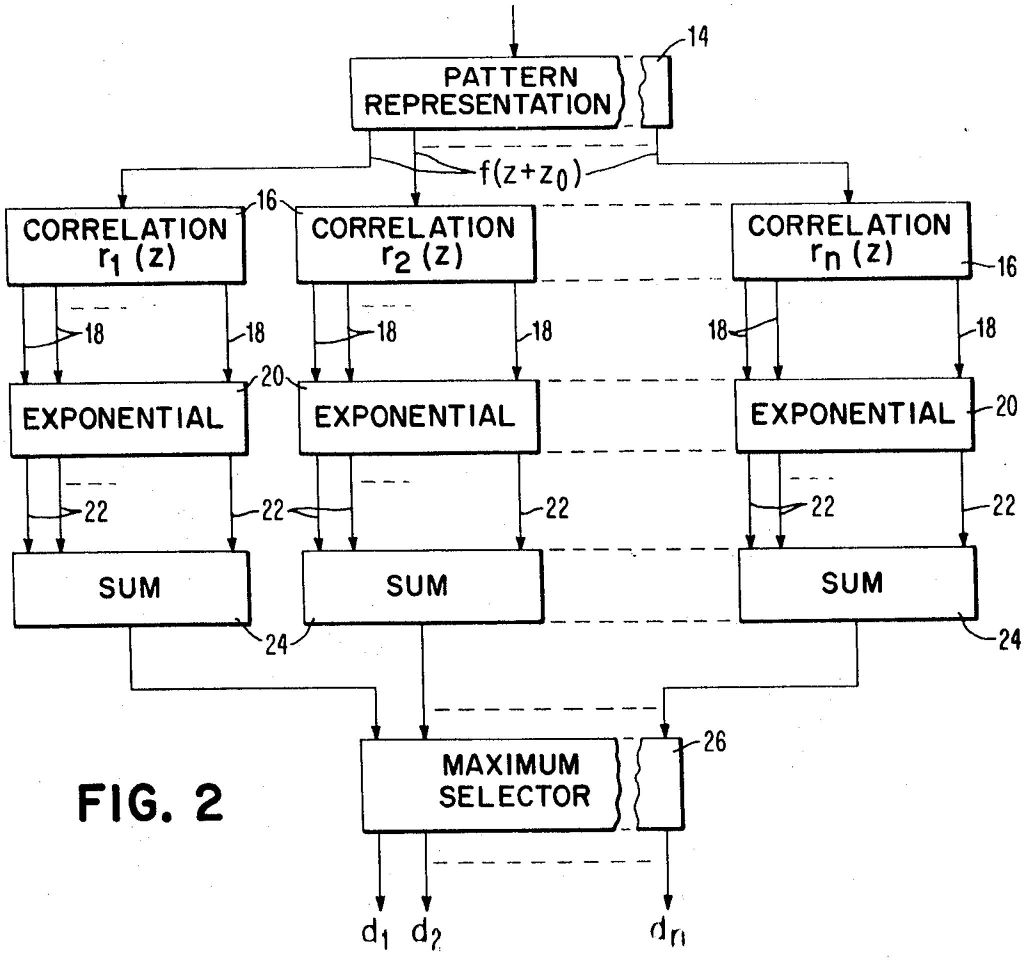
FIG. 2 is a block diagram showing in flow chart form the functional steps of the method of the present invention as applied to pattern classification.

The various steps of the method of the invention are illustrated in the flow chart of FIG. 2. A representation of an unknown pattern 14, $f(z+z_0)$, including displacement, is applied to a plurality of representations of stored patterns 16, $r_1(z)$, $r_2(z)$,...$r_n(z)$, and the unknown pattern is cross correlated with each of the known patterns to realize a plurality of correlation functions. Each correlation function is a function of displacement $z_0$, whether in electrical or optical form, and though not necessarily made up of discrete signals when initially produced, a plurality of such signals representative of the values which make up each function are derived. These signals are applied as individual inputs on lines 18 to a device, block 20, which produces an exponential of each of these values. More specifically, each value of the correlation function is used as an exponent and a constant is raised to a power equal to that value. This is accomplished most simply, from a structural standpoint, by applying signals representative of these values to devices, such as nonlinear diodes, which produce outputs which are exponentially related to the inputs. Such devices have a characteristic which may be represented as follows:

$$b=c^a$$

where $a$ = the input, $b$ = the output, and $c$ = a constant, usually equal to $e$. If a plurality of values of a correlation function are $a_1$, $a_2$, $a_3$,...$a_n$, after the exponential operation, these values are translated to $$c^{a_1},\ c^{a_2},\ c^{a_3},\ \cdots\ c^{a_n}.$$

Figure 3:
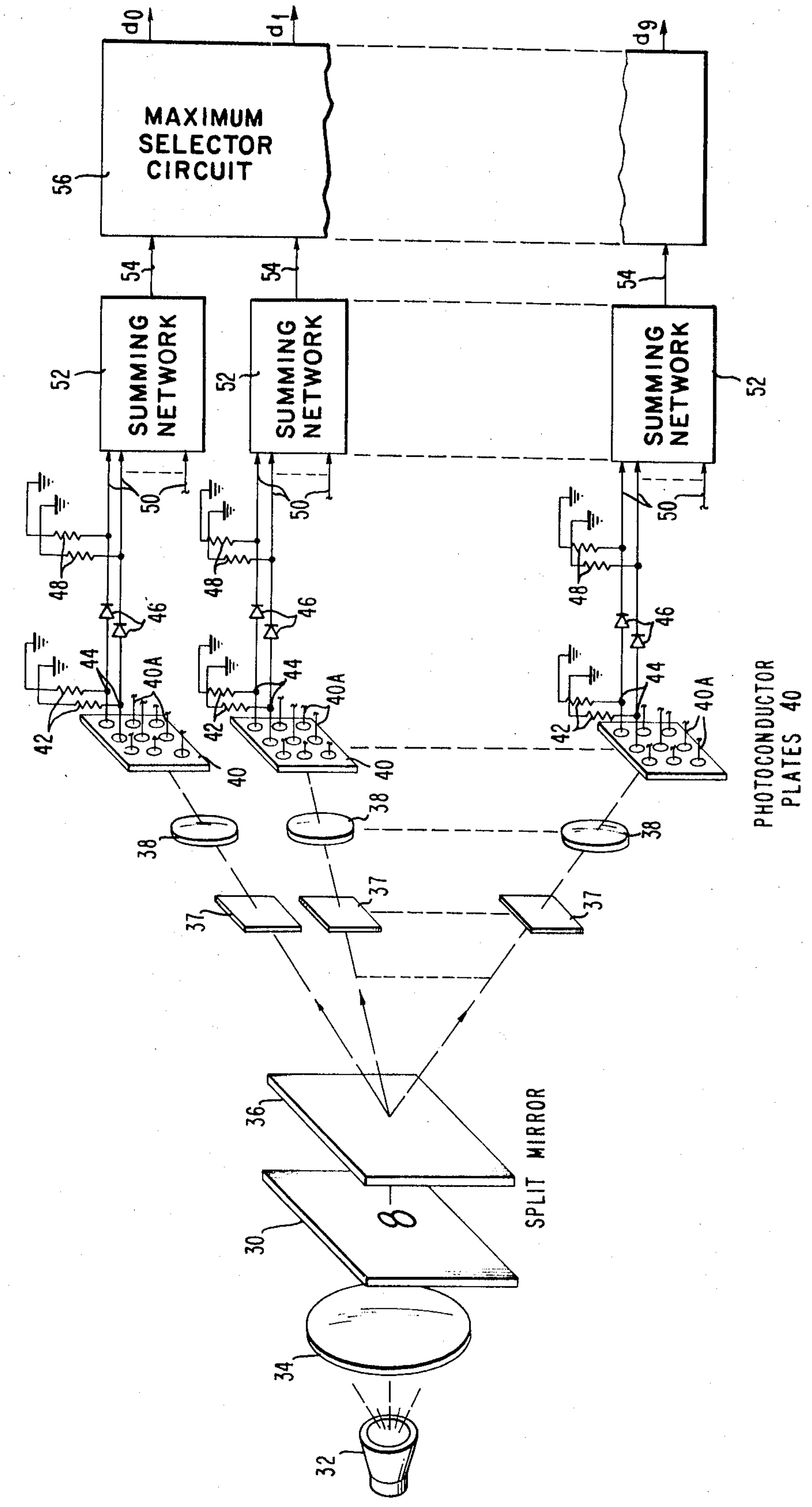
FIG. 3 is an embodiment of the present invention for recognizing decimal numbers using noncoherent light.

Outputs representative of these latter values, the exponential of the values of the correlation function, are applied via lines 22 in FIG. 2 to a summing device 24 where these values are combined. A single signal, representing the sum of the exponential of the values of each correlation function, is applied to a maximum selection device 26, which determines which sum is the largest. An output is then produced at the appropriate one of the terminals $d_1$, $d_2$,...$d_n$ to indicate the proper classification for the unknown pattern. Though not represented in the flow chart of FIG. 2, other steps common to the pattern classification technology may be incorporated into the system. For example, normalizing of the values representing the correlation functions can be carried out during or after one of the steps illustrated in FIG. 2. FIG. 3 is an embodiment of the present invention for recognizing decimal digits. The unknown digit to be recognized is in the form of a transparency recorded on document 30. The system of FIG. 3 includes, from left to right, a light source 32, a collimating lens 34, the document 30, a split mirror 36, 10 masks 37 and lenses 38, and a plurality of photoconductive plates 40. To this point the structure is the same as is commonly found in conventional character recognition systems. This portion of the showing is largely schematic and the details of the optics are not depicted, since this type of structure is well known in the art.

The light source 32 produces a light output which is collimated by lens 34 and applied to the document 30 and the unknown number to be recognized. An optical representation of this number is then applied to the split mirror 36 which in effect produces 10 images of this optical representation which are applied to the 10 masks 37. The optical output of each of these masks is an optical correlation of the unknown number with the number stored on the mask. Each of these optical correlation functions is imaged through an appropriate one of the lenses 38 on one of the photoconductor plates 40. Each of these photoconductor plates includes a number of discrete photodiodes and each of these diodes has a linear response, that is, the electrical output of the diode is linearly proportional to the intensity of the light applied to the diode. Each of the photoconductor plates 40 is shown to include nine diodes, though many more can be used. The optical correlation function applied to the plate 40 produces nine electrical outputs on the lines 40A. The magnitude of each of these outputs is representative of the intensity of a different portion of the applied correlation function.

Depending on the registration of the unknown image and its rotational orientation, the peak output may be from any one of the nine diodes. Since the outputs of all nine photodiodes of a given array are summed, after being operated upon by the nonlinear devices, it is immaterial which of the nine photodiodes produces the correlations peak at its output. In this way, translation invariance is provided.

The output circuit connected to the lines 40A is the same for all of the photodiodes. For the sake of clarity the circuit for only two of the diodes is shown in detail for each of the plates 40. The current produced by each photoconductor, which is linearly proportional to the intensity of the applied portion of the optical correlation function, flows through a resistor 42 connected to a reference potential, shown here as ground, to develop a proportional voltage at a terminal 44. This voltage is applied to one terminal of a connected diode 46, the other terminal of which is connected through another resistor 48 to a reference potential again shown as ground. Each of the diodes 46 is a nonlinear diode the output current of which is an exponential of the voltage across the diode. Electrical output signals are, therefore, produced on each of a plurality of lines 50. The magnitude of these signals is proportional to the exponential of the value of the intensity of that portion of the correlation function which is applied to the photodiode connected to the particular line 50.

For each of the 10 correlation functions, one for each mask, the signals on the nine lines 50 for that function are applied to a summing network 52. These signals are combined to produce a single sum output representing the sum of the exponentials. Ten such signals, one for each correlation function, are applied via lines 54, to a maximum selection circuit 56. This circuit compares these signals and determines which signal is the largest and produces an output at an appropriate one of the output terminals for the system $d_0$, $d_1$,...$d_9$. The summing network 52, and maximum selection circuitry 56 are similar to the type of circuitry normally found in pattern classification systems, and in other electronic apparatus and, therefore, only block diagram representations of these circuits are shown.

Thus, it can be seen that in the system of FIG. 3 the method of the invention is carried out in that a plurality of correlation functions are produced optically by comparing an optical representation of an unknown number with stored optical representations of the 10 known numbers in the decimal set. Each of the total correlation functions is applied to a photoconductor plate, and a number of signals, here nine, are derived which are linearly proportional to the intensity of different portions of the correlation function. The exponential operation on these outputs is carried out by the diodes 46, after which the summing and maximum selection operations are performed to identify the character.

Figure 4:
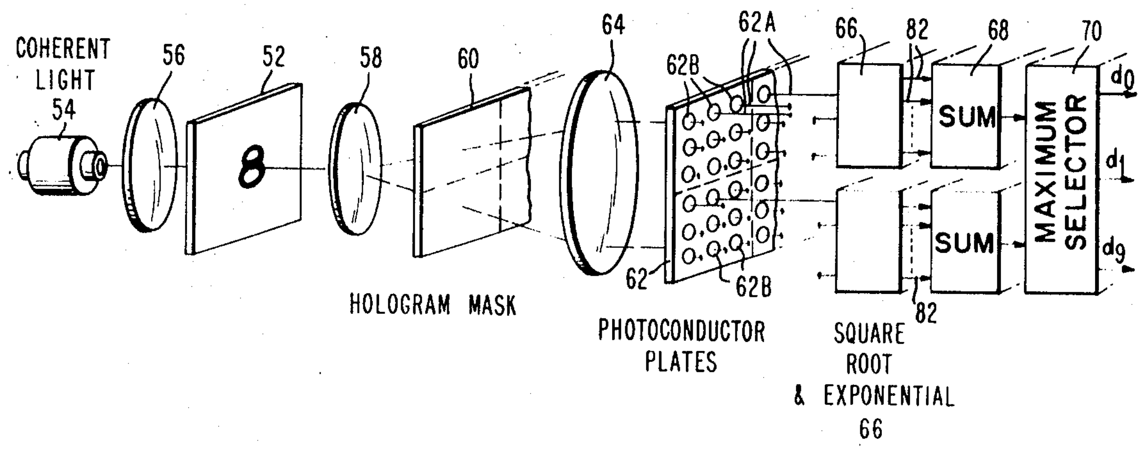
FIG. 4 is another embodiment of the present invention which employs coherent light and in which the functions of the known numbers are stored on a hologram.

Another embodiment of the invention is shown in FIG. 4, which is in many ways similar to that shown in FIG. 3, but differs in that the system of FIG. 4 is a coherent light system and employs holographic masks. In the system of FIG. 4, the number to be recognized is on a document 52, which is scanned by coherent light from a laser 54 applied through lens 56. The coherent light optical representation of the unknown character on document 52 is applied through a lens system represented at 58 to a mask which contains holographic representations of the 10 numerals in the set. These holographic representations are fourier transforms of these numerals. The optical output of the holographic mask 60 is a plurality of correlation functions, 10 in number, each of which is applied to an appropriate photoconductor plate 62 through a lens system represented at 64. As in the case, in the system of FIG. 3, the system up to this point is similar to that found in the prior art, and is, therefore, only schematically represented in the drawing of FIG. 4. As in FIG. 3, there are nine photodiodes 62B on each photoconductor plate 62 and nine current signals are realized on these diodes. The magnitude of each one of these signals is linearly proportional to the intensity of the incident coherent light whose amplitude represents a different portion of the applied correlation function. Since in this embodiment coherent light is used in combination with the holographic masks, the primary information in the optical correlation function applied to the photoconductor plates 40 is in the amplitude of the applied light rather than in the intensity. The signals produced on output lines 62A for the photodiodes are not applied directly to nonlinear exponential diodes as in the case in the noncoherent light embodiment of FIG. 3. The intensity of the light in the correlation function applied to the photodiodes on plates 62 is proportional to the square of the amplitude of the light. Therefore, a circuit is provided to first translate the output signals of the photodiodes 62B on plate 62 to values proportional to the square root of the values represented by the current on these lines. Thereafter, these signals, thus translated, are applied to nonlinear diodes to perform the necessary exponential function and the outputs of these diodes are, as before, summed for each correlation function and the summed outputs compared by the maximum selection circuitry to identify the unknown character. The circuits for performing the square root and exponential operation is represented in FIG. 4 by blocks 66, the summing networks by blocks 68, and the maximum selection circuit by block 70.

Figure 4A:
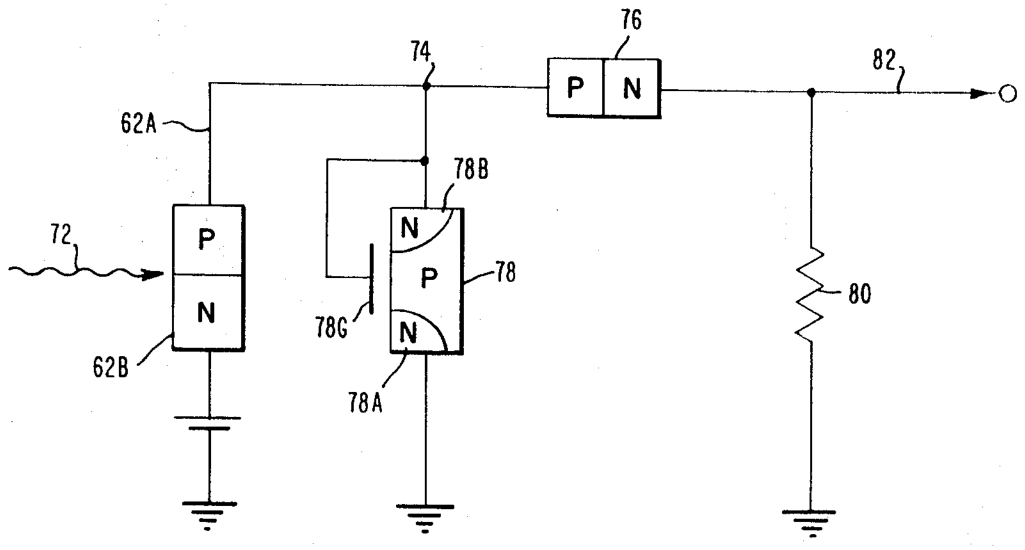
FIG. 4A is a more detailed showing of one of the circuits employed in the embodiment of FIG. 4.

The details of the output for each photodiode 62B, including the square root and exponential circuits according to the principles of the present invention, is shown in FIG. 4A. In this figure the circuit for one diode on one plate is shown. A similar circuit is provided for each diode on each of the photoconductor plates 62 in the system. In FIG. 4A the photodiode is again identified at 62B and is represented as a PN photodiode to which a portion of the optical correlation function is applied as indicated by the arrow 72. A current output is produced on the output line 62A for this diode which is proportional to the intensity of the input light 72. Output line 62A is connected to a terminal 74 which is, in turn, connected both to the input of a diode 76 which has the necessary exponential response and also to a circuit including an insulated gate field effect transistor 78. Conduction through the field effect transistor 78 between two terminals 78A and 78B for the transistor is controlled by voltage signals applied to a gate 78G. The response of this transistor is such that the signal applied to the diode 76 has a magnitude which is proportional to the square root of the magnitude of the signal developed on the output line 62A of the photodiode 62B. It is this square root signal which is applied to the diode 76 at which the exponential operation takes place to produce an output which is developed across a resistor 80 and is applied as an input via line 82 to the appropriate sum network 68 of FIG. 4. A detailed explanation of the characteristics of insulating gate field effect transistor is found in Proceedings of the IEEE for Sept. 1963, pp. 1190–1202. Thus, from the above it can be seen that the method of the invention allows the realization of extremely reliable pattern classification using all of the information in the correlation functions achieved by comparing the unknown function with a plurality of known functions. The system is translation invarient, that is, it is capable of recognizing unknown patterns which are not perfectly registered on the document from which it is read. Further, identifications of these patterns has been achieved even under conditions where some of the character information is missing (broken line, etc.) as is often the case in operational character recognition systems. Further, the system can be quite easily embodied in terms of the electrical circuitry necessary using very simple and inexpensive components such as in linear diodes and field effect transistors. These devices also have the advantage that they need not be individually fabricated but are capable of being integrated in monolithic structures. The devices may be fabricated as monolithic structures in integrated circuit form in such a way that they still remain discrete devices within the integrated structure. However, it is not necessary that the devices remain physically discrete as long as the various functions to be performed remain the same. Thus, it is possible to fabricate a system to carry out the present invention employing sheets of material, for example, for the photoconductor plates 40 to which the optical correlation functions are applied. On such sheets, there is developed a voltage profile in response to the applied optical correlation function, and the amplitude of the voltage at each of a plurality of points on the profile represents one of the values of the correlation function. In such a case crosstalk along the sheets must be minimized, but the practice of the invention remains the same since an electrical output representing the various values of the correlation function is derived. These values are applied to exponential circuit, which again need not be in discrete form, and the exponential process is carried out prior to the summing operation.

While the invention has been particularly shown and described with reference to preferred embodiments thereof, it will be understood by those skilled in the art that various changes in form and details may be made therein without departing from the spirit and scope of the invention.

I claim:

1. In a method of classifying patterns of the type in which a coherent light representation of an unknown pattern to be classified is correlated with each of a plurality of holographic stored representations of known patterns to obtain in optical form, by application of coherent light, for each such correlation, a correlation function, the improvement comprising the steps of:

a. applying each optical correlation function to a plurality of essentially linearly responsive photoresponsive devices to obtain, for each correlation function, a plurality of discrete electrical signals each having a value representative of a portion of said correlation function;
b. applying each said electrical signal to a square root circuit to produce a corresponding output electrical signal proportional to the square root of the input signal;
c. applying each last said electrical signal to an exponential circuit to produce an electrical output proportional to a constant raised to a power equal to the value of said last said signal;

d. for each correlation function summing the outputs from corresponding said exponential circuit; and e. comparing the summed outputs for the plurality of correlation functions to determine the proper classification for said unknown pattern.

2. The method of recognizing characters comprising the steps of:

a. obtaining an optical representation of an unknown character to be recognized by applying coherent light to the character;

b. applying said optical representation to a plurality of representations of known characters stored in holographic form to provide optical correlation functions of said unknown character representation with each of said stored character representations;

c. converting each said optical correlation function to a plurality of first electrical signals proportional to the intensity of the light in various portions of said correlation function;

d. for each said plurality of said first electrical signals deriving a corresponding plurality of second electrical signals proportional, signal for signal, to the square root of said first signals;

e. converting each said second electrical signal of each said plurality of second signals to a corresponding third electrical signal proportional to a constant raised to a power equal to the value of said second electrical signal being converted;

f. summing said corresponding third signals of each said plurality to provide one signal for each correlation function; and g. comparing last said signals for said correlation functions to determine which of said stored characters is the best match for said unknown character.

3. The method of recognizing characters comprising the steps of:

a. obtaining an optical representation of an unknown character to be recognized by applying coherent light to the character;

b. applying said optical representation to a plurality of representations of known characters stored in holographic form to provide optical correlation functions of said unknown character representation with each of said stored character representations;

c. converting each said optical correlation function to a plurality of first electrical signals proportional to the square of the amplitude of the light in various portions of said correlation function;

d. for each said plurality of said first electrical signals deriving a corresponding plurality of second electrical signals proportional, signal for signal, to the square root of said first signals;

e. converting each said second electrical signal of each said plurality of second signals into a corresponding third electrical signal proportional to a constant raised to a power equal to the value of said second electrical signal being converted;

f. summing said corresponding signals of each said plurality to provide one signal for each correlation function; and g. comparing last said signals for said correlation functions to determine which of said stored characters is the best match for said unknown character.

4. A pattern classification apparatus of the type which includes means for providing an optical representation of an unknown pattern, which is applied to means storing representations of a plurality of known patterns to provide optical correlation functions of said unknown pattern representation with each of said known pattern representations, and means to which said optical correlation functions are applied to classify said unknown pattern, the improvement being that said means to which said optical correlation functions are applied include:

a. a plurality of groups of photoresponsive devices, one group for each known representation, each said device being responsive to produce an electrical output representative of a different portion of the applied optical correlation function;

b. a plurality of groups of square root circuit devices each device being coupled to receive as an input signal the electrical output of a corresponding said photoresponsive device to produce an electrical output signal proportional to the square root of said input signal;

c. a plurality of groups of exponential devices each device being coupled to receive as an input signal the electrical output of a corresponding said square root device to produce an electrical signal proportional to a constant raised to a power proportional to said input signal;

d. a plurality of summing circuits, one for each said known representation, each being coupled to receive and sum all electrical outputs from a corresponding said group of exponential devices; and e. comparing circuitry coupled to receive the summed outputs of all said summing circuits and operative to indicate which of the summed outputs is largest.

5. The apparatus of claim 4 wherein each of the photoresponsive devices is a linearly responsive device, each of said square root devices is a field effect transistor, and each of said exponential devices is a nonlinear diode.

6. The apparatus of claim 4 wherein said optical representation of said unknown pattern is provided by applying coherent light to said pattern and said mask means store holographic representation of said plurality of known patterns.

7. A pattern classification apparatus of the type which includes means for providing an optical representation of an unknown pattern by applying coherent light to said pattern, which representation is applied to means storing holographic representations of a plurality of known patterns to provide an optical correlation function of said unknown pattern representation with each of said known pattern representations, and means to which said optical correlation functions are applied to classify said unknown pattern, the improvement being that said means to which said optical correlation functions are applied include:

a. a plurality of photoresponsive devices each responsive to produce an electrical output linearly proportional to the light intensity of a different portion of the applied optical correlation function;

b. a plurality of field effect transistors each being connected to receive and operative to convert said electrical output of a corresponding said photoresponsive device to a signal having a value equal to the square root of the value of said output signal; and c. a plurality of nonlinear diodes each having its input coupled to a corresponding one of said field effect transistors and its output connected to circuitry for analyzing the electrical outputs of these diodes to determine the proper classification of the unknown pattern.

PO-1050
(5/69)

UNITED STATES PATENT OFFICE
CERTIFICATE OF CORRECTION

Patent No. 3,602,887 Dated August 31, 1971

Inventor(s) Chao K. Chow

It is certified that error appears in the above-identified patent and that said Letters Patent are hereby corrected as shown below:

Column 3, line 62, cancel "o" and insert -- c -- .

Column 5, line 62, After "output" insert -- circuit -- .

Signed and sealed this 22nd day of May 1973.

(SEAL)
Attest:

EDWARD M.FLETCHER,JR.
Attesting Officer

ROBERT GOTTSCHALK
Commissioner of Patents